United States Patent Office 3,275,628
Patented Sept. 27, 1966

3,275,628
4-SUBSTITUTED-ALIPHATIC-2,2-DIALIPHATIC-1,2-DIHYDROQUINOLINES
Joseph Patrick Brown, Llangollen, Wales, assignor to Monsanto Chemicals Limited, London, England, a British company
No Drawing. Filed Oct. 29, 1963, Ser. No. 319,663
Claims priority, application Great Britain, Oct. 30, 1962, 40,891/62
19 Claims. (Cl. 260—247.5)

This invention relates to certain dihydroquinolines that are new chemical compounds and to a process for their production.

The compounds are useful as biocides, for example as fungicides, bactericides, or insecticides, and as intermediates in the production of biocides. Some of them are rubber antidegradants.

The new compounds of the invention are 4-substituted aliphatic-2,2-dialiphatic-1,2-dihydroquinolines and their salts, where the substituted aliphatic group in the 4-position is one that can be formed by the replacement of the halogen atom of a halogeno-aliphatic group by an atom or group derived from a nucleophilic reagent. The substituted aliphatic group can be, for example, an alkoxy-aliphatic, thiocyano-aliphatic, mercapto-aliphatic, or an amino-aliphatic group. A typical compound is for instance 4-diethylaminomethyl-2,2-dimethyl-1,2-dihydroquinoline.

The process of the invention is one for the production of a 4-substituted aliphatic-2,2-dialiphatic-1,2-dihydroquinoline or one of its salts, in which a 4-halogeno-aliphatic-2,2-dialiphatic-1,2-dihydroquinoline is reacted with a nucleophilic reagent.

The invention also includes a biocidal composition containing a new compound of the invention in admixture with a diluent.

A nucleophilic reagent is an entity having a relative excess of electrons; it can for example be an anion having a discrete negative charge such as for instance an alkoxy or thiocyanate ion, or a neutral molecule containing an unshared electron pair, for example ammonia or an amine. Nucleophilic substitution is a well-recognized type of reaction mechanism, and in the instance of the present process involves the distortion and eventual fission of the halogen-carbon bond in the halogeno-aliphatic group of the starting material. The distortion occurs in such a way that the carbon atom becomes deficient in electrons, so that attack by a nucleophilic reagent occurs at this atom. The halogen of the starting material separates as a halide ion, the net process being the replacement of the halogen by an atom or group derived from the nucleophilic reagent.

In a new dihydroquinoline, the substituted aliphatic group in the 4-position is preferably a substituted lower alkyl group, especially a substituted methly group.

The new dihydroquinolines include compounds containing one or more dihydroquinolyl radicals. The former are produced where the halogen atom of the halogeno-aliphatic group of the starting material is replaced by an atom or group derived from a mono-functional nucleophilic reagent, for example an alkoxide. The latter are produced where the nucleophilic reagent is poly-functional, for example a di-secondary amine, and the halogen atoms of two or more molecules of the starting material are replaced such that two or more dihydroquinol-4-yl-aliphatic radicals are linked to an atom or group derived from the nucleophilic reagent.

The new dihydroquinolines include the free secondary bases where the nitrogen atom of the dihydroquinoline nucleus carries a hydrogen atom; tertiary bases having this hydrogen atom replaced by, for example, an aliphatic group such as for instance an alkyl, cycloalkyl or aralkyl group, or by an aromatic group such as for instance an aryl group; salts of the secondary and tertiary bases; and N-acylated secondary bases in which the acyl group can be one derived from for example a carboxylic acid or from a sulphonic acid. Preferred are the free secondary bases, their salts and N-acylated derivatives.

The substituent in the 4-position of a new dihydroquinoline contains an aliphatic portion linked to an atom or group derived from a nucleophilic reagent. Where the dihydroquinoline contains one dihydroquinolyl radical, the atom or group can be, in addition to those already named, for example a hydroxyl group; a group that can exist as an anion where the anion is one of a weakly acidic substance, for example an aryloxy, arylthio, thiazolethio

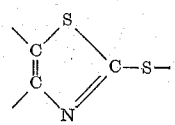

cyano, or dithiocarbamyl group

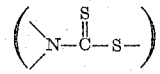

an isothiouronium group; or a group that is derived from a compound containing an activated methylene group, for example acetyl lower alkoxycarbonylmethyl

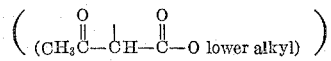

or bis(lower alkoxycarbonylmethyl)

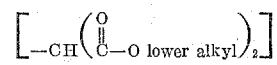

Sodium diethylmalonate is a useful nuclephilic reagent as are sodium salts of dithiocarbamic acids. Typical examples comprise sodium cyclopentamethylenedithiocarbamate, sodium morpholinocarbodithioate, sodium diethyldithiocarbamate, sodium dipropyldithiocarbamate, sodium diisopropyldithiocarbamate and sodium dibutyldithiocarbamate. It will be apparent that thiazolethio radicals embrace such well known radicals as unsubstituted 2-thiothiazolyl, lower alkyl substituted 2-thiothiazolyl and 2-thio arylenethiazolyls of the benzene series as for example, 2-thiobenzothiazolyl,
2-thio-4-methylbenzothiazolyl,
2-thio-5-chlorobenzothiazolyl,
2-thio-4-methylthiazolyl,
2-thio-4,5-dimethylthiazolyl.

Where the group linked to the aliphatic portion of the 4-substitutent is an alkoxy group it can be, for example, a methxy, ethoxy or propoxy group.

An amino group can be a primary group $NH_2$, a secondary group NHR, or a tertiary group NRR', where R and R' each represent an aliphatic or aromatic radical, or where in the tertiary group NRR', R and R' together represent a radical that forms a ring with the nitrogen atom. An aliphatic radical R or R' can be for example an alkyl group, such as a methyl, ethyl or butyl group, a cycloalkyl group, such as a cyclohexyl group, or an aralkyl group, such as a benzyl group. An aromatic group R or R' can be for example an aryl group such as for instance a phenyl or tolyl group or one of these groups having a substituent, for example a halogen atom, an alkoxy group, or a tertiary amino group, so that R or R' can be for instance a chlorophenyl, ethoxyphenyl or dimethylaminophenyl group. In other instances R or R' can be a heteroaromatic group, for instance a pyridyl group. Where the group NRR' is cyclic it can be for example a piperidino, morpholino or (in the form of a quaternary salt), a pyridyl group.

In a new dihydroquinoline that contains two or more 2,2 - dialiphatic-1,2-dihydroquinol-4-yl-aliphatic radicals, these are linked through a residue derived from the nucleophilic reagent. Such compounds include for example N,N-bis(dihydroquinol-4-yl-aliphatic)amines, for instance N,N-bis(dihydroquinol-4-yl-aliphatic) alkylamines,
N,N'-bis(dihydroquinol-4-yl-aliphatic)-diamines, for instance N,N'-bis(dihydroquinol-4-yl-aliphatic)-alkylenediamines,
N,N'-bis(dihydroquinol-4-yl-aliphatic)arylene-diamines and
N,N'-bis(dihydroquinol-4-yl-aliphatic)piperazines;
O,O'-bis(dihydroquinol-4-yl-aliphatic)glycols;

for instance

O,O'-bis(dihydroquinol-4-yl-aliphatic)alkylene glycols;
S,S'-bis(dihydroquinol-4-yl-aliphatic)dithiols, for instance S,S'-bis(dihydroquinol-4-yl-aliphatic)arylenedithiols; and
S,S'-bis(dihydroquinol-4-yl-aliphatic)bis(dithiocarbamates), for instance S,S'-bis(dihydroquinol-4-yl-aliphatic)alkylenebis-(dithiocarbamates).

The aliphatic groups in the 2-position and the aliphatic portion of the substituent in the 4-position of a new dihydroquinoline can each be for example an alkyl group, a cycloalkyl group, or an aralkyl group (as exemplified above). In the substituent in the 4-position, the atom or group derived from the nucleophilic reagent is usually linked to the alpha-carbon atom of the aliphatic portion. Preferably each aliphatic group is a lower alkyl group, especially a methyl group, and the corresponding preferred compounds are accordingly 4-(substituted methyl)2,2-dimethyl-1,2-dihydroquinolines.

Also included in the class of new compounds are dihydroquinolines where the nucleus (or nuclei) carries one or more substituents in addition to those present in positions 2 and 4. Such a substituent can be for example a halogen atom, such as fluorine, chlorine or bromine; an alkoxy group, such as a methoxy or ethoxy group; a hydroxy group; an amino group; a nitro group; an aliphatic group, for instance an alkyl, cycloalkyl or aralkyl group, (as exemplified above); or an aromatic group, for instance an aryl group, such as a phenyl or tolyl group.

New dihydroquinoline salts include the acid addition salts and the quaternary ammonium salts. An acid addition salt can be a salt of the dihydroquinoline with an inorganic acid, for example a hydrohalide salt such as for instance a hydrochloride, hydrobromide or hydroiodide, a sulphate or phosphate; or a salt of a dihydroquinoline with an organic acid, for example an oxalate, benzenesulphonate or picrate. A quaternary ammonium salt can be for example a quaternary halide or sulphate such as for instance a (dihydroquinolyl)methyl trialkyl ammonium chloride or a bis[(dihydroquinolyl) methyl] dialkyl ammonium sulphate.

In a new N-acylated dihydroquinoline the acyl group can be derived from an aliphatic carboxylic acid, for example an acetyl, propionyl or lauroyl group, from an aliphatic sulphonic acid, for example a methanesulphonyl or ethanesulphonyl group, or from an aromatic carboxylic acid, for example a benzoyl group, or from an aromatic sulphonic acid, for example a benzenesulphonyl or toluenesulphonyl group. Compounds where the acyl group is one derived from a lower carboxylic acid, for example an acetyl or propionyl group, are often preferred.

The preferred 4-(substituted-methyl)-2,2-dimethyl-1,2-dihydroquinolines include compounds having the formula:

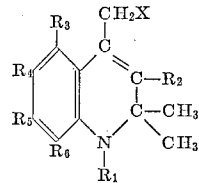

(I)

and compounds having the formula:

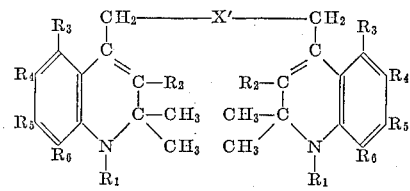

(II)

where X and X' are each an atom or group derived from a nucleophilic reagent, $R_1$ is hydrogen or an acyl group; $R_2$ is hydrogen or a halogen atom; and each of $R_3$, $R_4$, $R_5$ and $R_6$ is hydrogen or a substituent as exemplified above; and salts of compounds where $R_1$ is a hydrogen. Preferred classes comprise compounds where each of $R_2$ to $R_6$ represents hydrogen or halogen (provided that usually $R_2$ is hydrogen unless at least one of $R_3$ to $R_6$ is halogen); and compounds where one of $R_3$ to $R_6$ represents an alkyl or alkoxy group and $R_2$ and the remainder of $R_3$ to $R_6$ represent hydrogen or halogen, (provided that usually $R_2$ is hydrogen unless at least one of $R_3$ to $R_6$ is halogen). The preferred halogens are chlorine and bromine.

In compounds of Formula I above, X is preferably an alkoxy group, for instance a methoxy or ethoxy group, a thiocyano group, an N-substituted dithiocarbamyl group; for instance an N,N-dialkyldithiocarbamyl group; an isothiouronium group; a mercapto group; an amino group, for instance a dialkylamino, piperidino, morpholino, anilino or pyridylamino group. A preferred class of compounds of Formula II above are those where X is an alkylamino, an N,N'-alkylenediamino or an N,N'-piperazinyl group.

Examples of the new compounds of the invention are:

2,2-dimethyl-4-aminomethyl-1,2-dihydroquinolines,
2,2-dimethyl-4-aminomethyl-6-ethoxy-1,2-dihydroquinolines, the N-acetyl derivatives and hydrohalide salts of these compounds where the 4-aminomethyl group is aminomethyl itself, diethylaminomethyl, di-n-propylaminomethyl, morpholinomethyl, piperidinomethyl, or p-ethoxyanilinomethyl, for example N-acetyl-2,2-dimethyl-4-diethylaminomethyl-1,2-dihydroquinoline;
N-acetyl-2,2-dimethyl-4-diethylaminomethyl-6-ethoxy-1,2-dihydroquinoline;
N-acetyl-2,2-dimethyl-4-di-n-propylaminomethyl-1,2-dihydroquinoline;
N-acetyl-2,2-dimethyl-4-morpholinomethyl-1,2-dihydroquinoline;
N-acetyl-2,2-dimethyl-4-piperidinomethyl-1,2-dihydroquinoline;
N-acetyl-2,2-dimethyl-4-p-ethoxyanilinomethyl-1,2-dihydroquinoline;
2,2-dimethyl-4-diethylaminomethyl-1,2-dihydroquinoline;
2,2-dimethyl-4-morpholinomethyl-1,2-dihydroquinoline;
2,2-dimethyl-4-morpholinomethyl-1,2-dihydroquinoline dihydrobromide;
N-acetyl-2,2-dimethyl-6-ethoxy-4-morpholinomethyl-1,2,-dihydroquinoline; and 2,2-dimethyl-6-ethoxy-4-morpholinomethyl-1,2-dihydroquinoline;
bis(2,2-dimethyl-1,2-dihydroquinol-4-ylmethyl)dimethylammonium bromide;
2,2-dimethyl-4-(2'-benzothiazylthiomethyl)-1,2,-dihydroquinoline and its N-acetyl derivative;

N-acetyl-2,2-dimethyl-4-diethylamino-6-bromo-1,2-dihydroquinoline;
2,2-dimethyl-4-piperidinomethyl-6,8-dibromo-1,2-dihydroquinoline dihydrobromide; and
N-benzenesulphonyl-2,2-dimethyl-4-morpholinomethyl-6,7-dichloro-1,2-dihydroquinoline;

the following compounds in which $x$, $y$ and $z$ represent any three of the positions 3, 5, 6, 7 and 8 in the dihydroquinoline nucleus:

2,2-dimethyl-4-methoxymethyl-$x,y,z$-tribromo-1,2-dihydroquinolines;
2,2-dimethyl-4-ethoxymethyl-$x,y,z$-tribromo-1,2-dihydroquinolines;
2,2-dimethyl-4-thiocyano-methyl-$x,y,z$-tribromo-1,2-dihydroquinolines
2,2-dimethyl-4-(N,N'dimethyldithiocarbamyl)methyl-$x,y,z$-tribromo-1,2-dihydroquinolines
S-(2,2-dimethyl-$x,y,z$-tribromo-1,2-dihydroquinol-4-yl)-methyl isothiouronium bromides;
2,2-dimethyl-4-mercaptomethyl-$x,y,z$-tribromo-1,2-dihydroquinolines;
2,2-dimethyl-4-aminomethyl-$x,y,z$-tribromo-1,2-dihydroquinolines and their hydrohalide salts, where the 4-aminomethyl group is aminomethyl itself, dimethyl-aminoethyl, diethylaminomethyl, piperidinomethyl, morpholinomethyl, p-ethoxyanilinomethyl, p-dimethylaminoanilinomethyl, pyrid-2-yl-aminomethyl;

2,2-dimethyl-4-diethylaminomethyl-$x,y,z$-trichloro-1,2-dihydroquinolines;
2,2-dimethyl-4-n-propylaminomethyl-$x,y,z$-trichloro-1,2-dihydroquinoline hydrochlorides;
2,2-dimethyl-$x,y,z$-tribromo-1,2-dihydroquinolylmethyl piperidino methylammonium bromides;
bis[2,2-dimethyl-$x,y,z$-tribromo-1,2-dihydroquinol-4-yl-methyl] methylamines;
1,4-bis(2',2'-dimethyl-$x',y',z'$-tribromo-1',2'-dihydroquinol-4'-yl-methyl) piperazines and
2,2-dimethyl-4-(2'-benzothiazylthiomethyl)-$x,y,z$-tribromo-1,2-dihydroquinolines.

Specific examples of these compounds are:

2,2-dimethyl-4-methoxymethyl-3,6,8-tribromo-1,2-dihydroquinoline;
2,2-dimethyl-4-ethoxymethyl-3,5,7-tribromo-1,2-dihydroquinoline;
2,2-dimethyl-4-thiocyanomethyl-5,6,8-tribromo-1,2-dihydroquinoline;
2,2-dimethyl-4-(N,N-dimethyldithiocarbamyl)methyl-3,6,8-tribromo-1,2-dihydroquinoline;
S-(2,2-dimethyl-3,6,8-tribromo-1,2-dihydroquinol-4-yl)-methyl isothiouronium bromide;
2,2-dimethyl-4-mercaptomethyl-3,6,8-tribromo-1,2-dihydroquinoline;
2,2-dimethyl-4-dimethylaminomethyl-5,6,7-tribromo-1,2-dihydroquinoline;
2,2-dimethyl-4-diethylaminomethyl-3,6,8-tribromo-1,2-dihydroquinoline;
2,2-dimethyl-4-diethylamino-6,7,8-trichloro-1,2-dihydroquinoline;
2,2-dimethyl-4-n-propylaminomethyl-3,7,8-trichloro-1,2-dihydroquinoline hydrochloride;
2,2,-dimethyl-4-piperidinomethyl-3,6,8-tribromo-1,2-dihydroquinoline;
(2,2-dimethyl-3,6,8-tribromo-1,2-dihydroquinolyl)methylpiperidino-methylammonium bromide;
2,2-dimethyl-4-morpholinomethyl-3,6,8-tribromo-1,2-dihydroquinoline;
2,2-dimethyl-4-(p-ethoxyanilino)methyl-3,6,8-tribromo-1,2-dihydroquinoline;
2,2-dimethyl-4-(p-dimethylaminoanilino)methyl-3,6,8-tribromo-1,2-dihydroquinoline;
2,2-dimethyl-4-(p-dimethylaminoanilino)methyl-3,6,8-tribromo-1,2-dihydroquinoline hydrobromide;
2,2-dimethyl-4-(pyrid-2'-ylaminomethyl)-3,6,8-tribromo-1,2-dihydroquinoline;
2,2-dimethyl-4-(pyrid-2'-ylaminomethyl)-3,6,8-tribromo-1,2-dihydroquinoline hydrobromide;
2,2-dimethyl-4-(2'-benzothiazylthiomethyl)-3,6,8-tribromo-1,2-dihydroquinoline;
bis[(2,2-dimethyl-3,6,8-tribromo-1,2-dihydroquinolyl)methyl]methylamine; and
1,4-bis-2',2'-dimethyl-3,6,8-tribromo-1',2'-dihydroquinol-4'-ylmethyl)piperazine.

The 4-halogenoaliphatic - 2,2 - dialiphatic-1,2-dihydroquinolines that are starting materials in the process of the present invention can be obtained by the process described in British patent specification No. 16,594/61 and in my copending application Serial No. 188,518, now U.S. Patent No. 3,149,117.

The nucleophilic reagent employed in the process is one that is appropriate to the required product. Thus where the substituent in the 4-position of the dihydroquinoline is, for example, an alkoxyaliphatic group, the nucleophilic reagent is an alkoxide ion for which there is usually employed in practice a metal alkoxide; where the substituent is a thiocyanoaliphatic or dithiocarbamyl-aliphatic group, the nucleophilic reagent is usually introduced as a thiocyanate salt or dithiocarbamate salt respectively. In such instances the salt is preferably an alkali metal salt. Where for example the substituent is an amino-aliphatic group, the nucleophilic reagent is ammonia or an amine; and so on. The process can also be applied to the nucleophilic displacement of the halogen atom in the 4-halogenoaliphatic group of the 4-halogenoaliphatic-2,2-dialiphatic-1,2-dihydroquinoline by a different halogen atom.

The preferred 4-halogenoaliphatic-2,2-dialiphatic-1,2-dihydroquinoline starting materials are 4-bromoaliphatic- and 4 - chloroaliphatic-2,2-dialiphatic-1,2-dihydroquinolines.

The reaction of the 4-halogenoaliphatic-2,2-dialiphatic-1,2-dihydroquinoline with the nucleophilic reagent is preferably conducted in the presence of an inert solvent. Useful solvents include ketones such as for instance acetone or methyl ethyl ketone, alcohols such as for instance methanol or ethanol, hydrocarbons such as for instance petroleum ether, benzene or toluene, and halogenated hydrocarbons such as for instance chloroform, or carbon tetrachloride. In some instances it is convenient to use a mixed organic-aqueous solvent system (when the organic solvent selected can be one that is either miscible or immiscible with water) while in others anhydrous conditions are preferred, when the solvent selected is usually one that is readily obtained free from water, for example benzene.

The process can often be conducted satisfactorily at room temperature, but it is generally preferable to use a somewhat elevated temperature, for example 40 to 50° C., or in some instances a temperature of up to about 100° C.

Equivalent quantities of reactants or quantities that are substantially so are usually employed. Where the nucleophilic reagent is a monoamine, however, and the required product is a free base, it may be convenient to use two equivalents of the amine.

A hydrohalide salt of a dihydroquinoline is in some instances the primary product of the process. In general a salt can be obtained by treating the free base with the appropriate reagent, that is to say with an acid where the salt is an acid addition salt or with for example an alkyl halide, such as ethyl bromide, where the salt is a quaternary ammonium salt.

New dihydroquinolines of the invention that are acylated on the ring nitrogen atom are usually obtained by using an appropriately N-acylated starting material, but if desired a new dihydroquinoline base can in suitable instances be acylated by one of the conventional processes for the acylation of amines.

Where one of the compounds is employed as a biocide, it is usually used in the form of a mixture with a diluent, for example an inert diluent, Such a mixture can be liquid or solid.

In a solid mixture, the diluent is usually a powder, for instance kieselguhr or talc.

The invention is illustrated by the following examples:

Example 1

This example describes the production of N-acetyl 2,2-dimethyl-4-diethylaminomethyl-1,2-dihydroquinoline and 2,2-dimethyl-4-diethylaminomethyl-1,2-dihydroquinoline.

10 cc. of anhydrous diethylamine were added to a solution of 11.17 grams of N-acetyl-4-bromomethyl-2,2-dimethyl-1,2-dihydroquinoline in 100 cc. of benzene. Next day, the mixture was filtered to remove diethylamine hydrobromide and the filtrate was evaporated giving N-acetyl-2,2-dimethyl-4-diethylaminomethyl - 1,2 - dihydroquinoline as a thick syrup.

This syrup was boiled for 10 minutes with a solution of 10 cc. of concentrated hydrochloric acid in 40 cc. of water and the reaction mixture was then cooled and extracted with ether. The aqueous layer was made alkaline by the addition of sodium hydroxide solution and was extracted with ether. The second ether extracts were washed with water, dried and distilled to give 6.5 grams of 2,2-dimethyl-4-diethylamino-methyl-1,2-dihydroquinoline as an oil having a boiling point of 120–125° C. at a pressure of 0.7 millimetres of mercury.

Example 2

This example describes the production of N-acetyl-2,2-dimethyl-4-morpholinomethyl - 1,2-dihydroquinoline and 2,2-dimethyl-4-morpholinomethyl-1,2-dihydroquinoline.

20 cc. of morpholine were added to a solution of 35.3 grams of N-acetyl-4-bromomethyl-2,2-dimethyl-1,2-dihydroquinoline in 300 cc. of acetone. Next day, the mixture was filtered to remove morpholine hydrobromide, and the acetone was evaporated from the filtrate giving 20.3 grams of N-acetyl-2,2-dimethyl-4-morpholinomethyl-1,2-dihydroquinoline having a melting point of 88–89° C. A sample recrystallized from ethanol had the same melting point and the composition: C, 72.5; H, 8.6; N, 9.5. ($C_{18}H_{24}N_2O_2$ required C, 72.0; N, 8.0; N, 9.3%.)

A solution of 6 grams of the N-acetyl compound in 20 cc. of ethanol was boiled for half an hour with 10 cc. of concentrated hydrochloric acid. The product was then cooled, 100 cc. of water were added and the solution was extracted with ether. The addition of an excess of sodium hydroxide solution to the aqueous layer gave 4.9 grams of 2,2-dimethyl-4-morpholinomethyl-1,2-dihydroquinoline as a solid having a melting point of 129–131° C. (Found: N, 10.8%. $C_{16}H_{22}N_2O$ requires N, 10.9%.)

Example 3

This example describes the production of N-acetyl-2,2-dimethyl - 6 - ethoxy - 4 - morpholinomethyl - 1,2 - dihydroquinoline and the corresponding free base.

2 cc. of morpholine were added to a solution of 3.4 grams of N-acetyl-4-bromomethyl-6-ethoxy-2,2-dimethyl-1,2-dihydroquinoline in 20 cc. of benzene. After 3 hours, the solution was filtered to remove morpholine hydrobromide, and the benzene was distilled from the filtrate. The residue thus obtained gradually deposited crystals which were filtered off and washed with ethanol. Recrystallization from ethanol gave N-acetyl-2,2-dimethyl-6 - ethoxy - 4 - morpholinomethyl - 1,2 - dihydroquinoline as pale yellow prisms having a melting point of 136–137° C. (Found: C, 69.3; H, 8.0; N, 8.1%. $C_{20}H_{28}N_2O_3$ requires C, 69.8; H, 8.1; N, 8.1%.)

9.5 cc. of concentrated hydrochloric acid were added to a solution of 5.9 grams of the acetyl compound in 25 ll. of ethanol, and the solution was boiled for 1 hour. After cooling, 250 cc. of water were added followed by an excess of sodium hydroxide solution. 1.8 grams of 2,2 - dimethyl - 6 - ethoxy - 4 - morpholinomethyl - 1,2-dihydroquinoline have a melting point of 86–87° C. were precipitated. A sample recrystallized from ethanol had the same melting point. (Found: C, 71.2; H, 8.5; N, 9.3%. $C_{18}H_{26}N_2O_2$ requires C, 71.5; H, 8.6; N, 9.3%.)

Example 4

This example describes the production of a 2,2-dimethyl-4-methoxymethyl-tribromo-1,2-dihydroquinoline.

The same starting material, a 4-bromomethyl-2,2-dimethyltribromo-1,2-dihydroquinoline, was used in this and in subsequent examples. In it, the three bromine atoms designated "tribromo" occupied three of the positions 3, 5, 6, 7 and 8 in the dihydroquinoline nucleus, probably the 3, 6 and 8 positions.

A solution containing 5 grams of 4-bromomethyl-tribromo-1,2-dihydroquinoline and 3 grams of sodium in 250 cc. of methanol was boiled under reflux for one hour. The bulk of the methanol was then distilled off, and on cooling the residue 4.2 grams of 2,2-dimethyl-4-methoxymethyltribromo-1,2-dihydroquinoline separated and were collected. Its melting point, which was not raised by recrystallization from ethanol, was 150–152° C. (Found: C, 35.8; H, 3.2; N, 3.0; Br, 54.5%. $C_{13}H_{14}Br_3NO$ requires C, 35.5; H, 3.2; N, 3.2; Br, 54.5%.)

Example 5

This example describes the production of 2,2-dimethyl-4-ethoxymethyl-tribromo-1,2-dihydroquinoline.

A solution of 1.1 grams of sodium hydroxide in 0.9 cc. of water was added to a partial solution of 0.35 gram of 4-bromomethyl-2,2-dimethyl-tribromo-1,2-dihydroquinoline in 15 cc. of ethanol, and the mixture was boiled for one hour. 10 cc. of water were then added, and on cooling 0.25 gram of 2,2-dimethyl-4-ethoxymethyl-tribromo-1,2-dihydroquinoline separated. Recrystallization from ethanol gave the product as colorless prisms having a melting point of 78–79.5° C. (Found: C, 37.3; H, 3.7; N, 3.; Br, 52.4%. $C_{14}H_{16}Br_3NO$ requires C, 37.0; H, 3.5; N, 3.1; Br, 52.9%.)

Example 6

This example describes the production of 2,2-dimethyl-4-thiocyanomethyl-tribromo-1,2-dihydroquinoline.

A solution of 1.2 grams of potassium thiocyanate in 20 cc. of acetone was added to a solution of 4.9 grams of 4-bromomethyl-2,2-dimethyl-tribromo-1,2-dihydroquinoline in 70 cc. of acetone at 45° C. Next day, the solution was filtered to remove potassium bromide and the acetone was evaporated from the filtrate. The residue thus obtained was washed with a small volume of ethanol to give 4.5 grams of yellow crystals. Recrystallization from ethanol gave 2,2-dimethyl-4-thiocyanomethyl-tribromo-1,2-dihydroquinoline having a melting point of 123–124.5° C. (Found: C, 33.85; H, 2.6; N, 5.8; S, 6.6; Br, 51.3%. $C_{13}H_{11}Br_3N_2S$ requires C, 33.4; H, 2.5; N, 6.0; S, 6.9; Br, 51.4%.)

Example 7

This example describes the production of S-(2,2-dimethyl - tribromo-1,2-dihydroquinolyl-4-methyl) isothiouronium bromide and the corresponding 2,2-dimethyl-4-mercaptomethyl-tribromo-1,2-dihydroquinoline.

6 grams of thiourea were added to a solution of 29.4 grams of 4-bromomethyl-2,2-dimethyl-tribromo-1,2-dihydroquinoline in 360 cc. of acetone at 45–50° C., and the solution was then boiled for one hour. On cooling, S - (2,2 - dimethyl - tribromo - 1,2 - dihydroquinol - 4-ylmethyl)isothiouronium bromide separated from the solution and was filtered off. The yield was 28.9 grams, and the melting point 199–200° C. (with decomposition).

A solution of 3 grams of sodium hydroxide in 10 cc. of water was added slowly to a solution of 17 grams of the isothiouronium bromide in 75 cc. of hot ethanol. After one hour, excess water was added and a solid (12 grams) which had separated on cooling was filtered off. Recrystallization of the solid from ethanol gave 2,2-dimethyl - 4 - mercaptomethyl - tribromo - 1,2 - dihydroquinoline as pale yellow prisms having a melting point of 129° C. (Found: C, 32.7; H, 2.9; N, 3.2; S, 7.1; Br, 54.3%. $C_{12}H_{12}Br_3NS$ requires C, 32.5; H, 2.5; N, 3.2; S, 7.2; Br, 54.3%.)

Example 8

This example describes the production of 2,2-dimethyl-4 - (N,N - dimethyldithiocarbamyl)methyl - tribromo-1,2-dihydroquinoline.

A solution of 7 grams of sodium N,N-dimethyldithiocarbamate in 100 cc. of boiling acetone was added to a solution of 4-bromomethyl-2,2-dimethyl-tribromo-1,2-dihydroquinoline in 200 cc. of warm acetone. A solid separated slowly and after 2 hours was filtered off, a second crop being obtained by concentration of the filtrate. The two crops of solid were combined and then stirred in water for some hours to dissolve out sodium bromide. The material remaining undissolved was 2,2-dimethyl-4-(N,N - dimethyldithiocarbamyl)methyl - tribromo - 1,2-dihydroquinoline having a melting point of 164–165° C. The melting point was unchanged on recrystallization. (Found: C, 34.0; H, 3.4; N, 5.1; S, 11.8; Br, 45.3%. $C_{15}H_{16}Br_3N_2S_2$ requires C, 34.1; H, 3.0; N, 5.3; S, 12.1; Br, 45.5%.)

Example 9

This example describes the production of 2,2-dimethyl-4-dimethylaminomethyl-tribromo-1,2-dihydroquinoline.

5 grams of 2,2-dimethyl-4-bromomethyl-tribromo-1,2-dihydroquinoline were dissolved with heating in 325 cc. of ethanol. The solution was cooled to 45° C. and 15 cc. of aqueous dimethylamine containing 36% by weight of dimethylamine were added. Next day the bulk of the solvent was evaporated and a solid separated from the solution. The solid, which weighed 4 grams, was isolated by filtration. Recrystallization from ethanol gave 2,2-dimethyl-4-dimethylaminomethyl - tribromo - 1,2 - dihydroquinoline as pale yellow needles having a melting point of 82–88° C. (Found: C, 37.2; H, 3.7; N, 6.0; Br, 52.8%. $C_{14}H_{17}N_2Br_3$ requires: C, 37.1; H, 3.7; N, 6.2; Br, 53.0%.)

Example 10

This example describes the production of 2,2-dimethyl-4-diethylaminomethyl-tribromo-1,2-dihydroquinoline.

18 cc. of diethylamine were added to a solution of 20 grams of 4-bromomethyl-2,2-dimethyl-tribromo-1,2-dihydroquinoline in 250 cc. of warm acetone. Next day, the solution was filtered to remove diethylamine hydrobromide, and the filtrate was evaporated to yield an oil which slowly solidified. This was recrystallized from a small volume of ethanol to give 14.7 grams of 2,2-dimethyl - 4 - diethylaminomethyl - tribromo - 1,2 - dihydroquinoline having a melting point of 57–59° C. (Found: C, 39.7; H, 4.1; N, 5.6%. $C_{15}H_{19}N_2Br_3$ requires C, 39.9; H, 4.4; N, 5.8%.)

Example 11

This example describes the production of 2,2-dimethyl-4-piperidinomethyl-tribromo-1,2-dihydroquinoline.

7 cc. of piperidine were added to a solution of 14.5 grams of 4-bromomethyl-2,2-dimethyl-tribromo-1,2-dihydroquinoline in 175 cc. of acetone at 44° C. The temperature of the mixture was then held at 50° C. for 1 hour. Next day, the mixture was filtered to remove piperidine hydrobromide, and the solvent was evaporated from the filtrate giving 13.75 grams of 2,2-dimethyl-4-piperidinomethyl-tribromo-1,2-dihydroquinoline having a melting point of 82–85° C.

A sample recrystallized from ethanol had the same melting point. (Found: C, 41.4; H, 4.3; N, 5.7%. $C_{17}H_{21}Br_3N_2$ requires C, 41.4; H, 4.4; N, 5.5%.)

Example 12

This example describes the production of 2,2-dimethyl-4-morpholinomethyl-tribromo-1,2-dihydroquinoline.

12 cc. of morpholine were added to a solution of 30 grams of 4-bromomethyl-2,2-dimethyl-tribromo-1,2-dihydroquinoline in 350 cc. of acetone at 45° C. After 2 hours the mixture was filtered to remove morpholine hydrobromide, and the solvent was evaporated from the filtrate giving 23.7 grams of 2-dimethyl-4-morpholinomethyl-tribromo-1,2-dihydroquinoline having a melting point of 128–133° C.

A sample recrystallized from ethanol melted at 135–138° C. (Found: C, 38.9; H, 3.7; N, 5.4%.

required C, 38.8; H, 3.9; N, 5.7%.)

Example 13

This example describes the production of 2,2-dimethyl-4 - (p-ethoxyanilino) methyl - tribromo-1,2-dihydroquinoline.

12 cc. of p-phenetidine were added to a solution of 14.5 grams of 4-bromomethyl-2,2-dimethyl-tribromo-1,2-dihydroquinoline in 175 cc. of acetone at 44° C. Next day, the acetone was evaporated from the mixture giving a solid residue which was washed with a small volume of acetone and then stirred with water to dissolve out p-phenetidine hydrobromide. The water-insoluble residue was isolated by filtration and dried to give 13.6 grams of 2,2-dimethyl-4-(p-ethoxyanilino) methyl-tribromo - 1,2-dihydroquinoline having a melting point of 135–137° C. A sample recrystallized from ethanol had the same melting point. (Found: C, 44.2; H, 3.6; N, 5.0; Br. 44.0%. $C_{20}H_{21}Br_3N_2O$ requires C, 44.0; H, 3.9; N, 5.1; Br, 44.0%.)

Example 14

This example describes the production of 2,2-dimethyl-4 - (p - dimethylaminoanilino)methyl-tribromo - 1,2 - dihydroquinoline hydrobromide and the free base.

4.5 grams of p-dimethylaminoaniline were added to a solution of 16.3 grams of 4-bromomethyl-2,2-dimethyl-tribromo-1,2-dihydroquinoline in 200 cc. of acetone at about 45° C. During 4 days a solid product separated from the solution. It was isolated by filtration and recrystallized from ethanol to give 2,2-dimethyl-4-(p-dimethylaminoanilino)methyl-tribromo-1,2 - dihydroquinoline hydrobromide having a melting point (with decomposition) of 240° C.

The free base was obtained by pouring an ethanolic solution of the hydrobromide into aqueous alkali and recrystallizing the precipitate from ethanol. 2,2-dimethyl-4-(p-dimethylaminoanilino)methyl - tribromo - 1,2 - dihydroquinoline had a melting point of 164–165° C. (Found: C, 44.44; H, 4.0; N, 7.5; Br. 44.3%.

$$C_{20}H_{22}Br_3N_3$$

requires C, 44.3; H, 4.1; N, 7.7; Br. 44.3%.)

Example 15

This example describes the production of 2,2-dimethyl-4-(pyrid-2'-ylaminomethyl)-tribromo - 1,2 - dihydroquinoline hydrobromide.

A solution of 1 gram of 2-aminopyridine in 5 cc. of acetone was added to a solution of 4.9 grams of 4-bromomethyl-2,2-dimethyl-tribromo-1,2-dihydroquinoline in 60 cc. of acetone at 45° C. The mixture was allowed to stand for 2 hours and was then boiled for one-half hour, when a yellow solid began to separate from the solution.

After cooling, the solid was isolated by filtration in a yield of 4.4 grams. Its elementary analysis: C, 34.9; H, 3.1; N, 6.8; Br. 56.0% agreed closely with that required for 2,2-dimethyl-4-(pyrid-2'-ylaminomethyl) - tribromo - 1,2-dihydroquinoline hydrobromide (C, 35.0; H, 2.9; N, 7.2; Br, 54.9%).

*Example 16*

This example describes the production of bis[(2,2-dimethyl - tribromo - 1,2 - dihydroquinol - 4 - yl)methyl]-methylamine.

A solution of 4 grams of methylamine hydrochloride in 50 cc. of ethanol was partly neutralized by the addition of a solution of 2 grams of sodium hydroxide in 5 cc. of water. Sodium chloride was precipitated and the amine solution was decanted from it into a solution of 4.9 grams of 4-bromomethyl-2,2-dimethyl-tribromo-1,2-dihydroquinoline in 60 cc. of acetone at 45° C. Next day, the bulk of the acetone was evaporated, the residue was washed with a small volume of ethanol and then with water. The water-insoluble material (2.6 grams) was slightly impure bis[(2,2-dimethyl-tribromo-1,2-dihydroquinol-4-yl) methyl]methylamine having a melting point of 205–208° C. A sample recrystallized from ethanol had a melting point of 211–212° C. (Found: C, 35.5; H, 3.1; N, 4.9; Br, 56.2%. $C_{25}H_{25}Br_6N_3$ requires C, 35.4; H, 3.0; N, 5.0; Br, 56.7%.)

*Example 17*

This example describes the production of 1,4-bis(2',2'-dimethyl-tribromo - 1',2' - dihydroquinol - 4' - ylmethyl)-piperazine.

A solution of 1.3 grams of piperazine in 5 cc. of acetone was added to a solution of 14.7 grams of 4-bromoethyl-2,2-dimethyl-tribromo-1,2-dihydroquinoline in 200 cc. of acetone. A solid precipitated on standing, and was collected by filtration next day. The solid was stirred with water to dissolve out piperazine hydrobromide, when there remained undissolved 6.3 grams of 1,4-bis(2',2'-dimethyl - tribromo - 1',2' - dihydroquinol-4'-ylmethyl)piperazine as pale yellow prisms having a melting point of 259–260° C. (Found: C, 37.2; H, 3.3; N, 5.7; Br, 53.9%. $C_{28}H_{30}Br_6N_4$ requires C, 37.3; H, 3.3; N, 6.2; Br, 53.2%.)

*Example 18*

This example describes the production of the hydrochloride of 2,2-dimethyl-4-aminomethyl-tribromo-1,2-dihydroquinoline.

A solution of 19.8 grams of 2,2-dimethyl-4-bromomethyltribromo-1,2-dihydroquinoline in 400 cc. of acetone was added to a mixture of 100 cc. of aqueous ammonia (S.G. 0.880) and 300 cc. of ethanol. During two days, 4.1 grams of crystalline material having a melting point of 173–174° C. precipitated, and this material was subsequently separated by filtration.

The filtrate was concentrated to a volume of about 150 cc. and was then diluted with 500 cc. of water, thereby precipitating a sticky solid. This was separated from the supernatant liquor and stirred with ethanol. Most of the solid dissolved, and the small insoluble residue was shown to be identical with the crystalline material, melting point 173–174° C., obtained in the first stage of the process.

Treatment of the ethanol solution with concentrated hydrochloric acid gave 10 grams of a white precipitate of the hydrochloride of 2,2-dimethyl-4-aminomethyl-tribromo-1,2-dihydroquinoline having a melting point of 220–222° C. The melting point was raised to 240–241° C. on recrystallization from a large volume of ethanol. (Found: C, 30.7; H, 3.5; N, 5.8; Br, 51.0%. $C_{12}H_{14}Br_3ClN$ requires: C, 31.2; H, 3.1; N, 6.1; Br, 52.0%.)

*Example 19*

This example describes the method used to assess bactericidal properties, and gives the results obtained with the isothiouronium bromide of Example 7 and the hydrochloride of Example 18.

0.8 cc. of a 1% solution of the compound was incorporated into 20 cc. of warm Oxoid Nutrient Broth No. 2 agar in a test tube giving a concentration of 0.02% of the compound in the medium. The warm agar was immediately poured into a sterile petri dish and when hard it was streaked with a culture of the test bacteria. The inoculated plate was incubated for 24 hours at 37° C., after which time it was examined for the presence or absence of growth of the organisms. If the bacteria failed to grow at this concentration (i.e. 0.02%) the test was repeated at a lower concentration of the test compound until a concentration was reached at which the organisms under test were found to grow. The penultimate concentration was recorded as the minimum concentration of the test compound necessary to inhibit the growth of the bacteria.

The results obtained were as follows: the minimum inhibitory concentration of S-(2,2-dimethyl-tribromo-1,2-dihydroquinol-4-yl)isothiouronium bromide for *Salmonnella typhi* was 0.01%, and for *Staphylococcus aureaus* and *Bacillus subtilis* 0.002%. The minimum inhibitory concentration of the hydrochloride of 2,2-dimethyl-4-aminomethyltribromo-1,2-dihydroquinoline for *Staphylococcus aureus* was 0.02% and for *Bacillus subtilis* 0.01%.

*Example 20*

This example describes the production of 2,2-dimethyl-4-(2'-benzothiazylthiomethyl)-tribromo - 1,2 - dihydroquinoline.

A solution of 6.3 grams of the sodium salt of 2-mercaptobenzothiazole in 70 cc. of acetone was added to a solution of 16.3 grams of 4-bromomethyl-2,2-dimethyl-tribromo-1,2-dihydroquinoline in 200 cc. of warm acetone. The mixture was allowed to stand for 3 hours and then sodium bromide which had precipitated was filtered off.

Evaporation of the solvent from the filtrate gave a resinous residue which gradually solidified on trituration with a mixture of 10 cc. of acetone and 30 cc. of ethanol to give 18.6 grams of product having a melting point of 118–123° C.

A sample crystallized from methyl ethyl ketone had a melting point of 121–122° C. (Found: C, 39.8; H, 2.7; Br, 41.7; N, 4.7; S, 11.0%. $C_{19}H_{15}Br_3N_2S_2$ requires: C, 39.6; H, 2.6; Br, 41.7; N, 4.9; S, 11.1%.)

*Example 21*

This example describes the production of N-acetyl-2,2-dimethyl-4-(2'-benzothiazylthiomethyl) - 1,2 - dihydroquinoline.

A solution of 18.9 grams of the sodium salt of 2-mercaptobenzothiazole in 200 cc. of acetone was added to a solution of 29.4 grams of N-acetyl-4-bromomethyl-2,2-dimethyl-1,2-dihydroquinoline in 100 cc. of acetone and the mixture was boiled under reflux for 5 minutes. After cooling, sodium bromide which had precipitated was filtered off.

Concentration of the filtrate gave 29.5 grams of N-acetyl - 2,2 - dimethyl-4-(2'-benzothiazylthiomethyl)-1,2-dihydroquinoline having a melting point of 132–133° C., and further concentration of the mother liquors gave 4.3 grams of less pure material having a melting point of 110–112° C.

A sample of the first crop was recrystallized from ethanol and was obtained as white prisms having a melting point of 133–134° C. (Found: C, 65.5; H, 5.3; N, 7.1; S, 16.0%. $C_{21}H_{20}N_2OS_2$ requires: C, 66.3; H, 5.3; N, 7.4; S, 16.8%.)

*Example 22*

This example describes the production of the quaternary salt bis(2,2-dimethyl-1,2-dihydroquinol-4-ylmethyl)-dimethylammonium bromide.

15 cc. of 36% aqueous dimethylamine were added at room temperature to a solution of 10 grams of 4-bromomethyl-2,2-dimethyl-1,2-dihydroquinoline hydrobromide in 100 cc. of ethanol. After standing overnight, the solvent was removed by evaporation under reduced pressure at room temperature. The residue was a mixture of resinous material and solid. Addition of 30 cc. of ethanol to the mixture dissolved the resin, while the solid remained out of solution, thus permitting its separation by filtration. The weight of the solid was 1.1 grams and its melting point 215–217° C. This melting point was not increased by recrystallization of the solid from ethanol. Analytical results showed that the solid was bis(2,2-dimethyl - 1,2 - dihydroquinol-4-ylmethyl) dimethylammonium bromide. (Found: C, 66.3; H, 7.5; N, 8.8; Br, 17.3%. $C_{26}H_{34}BrN_3$ requires: C, 66.7; H, 7.3; N, 9.0; Br, 17.1.%)

The new compounds in which the 4-substituent is an aminoaliphatic substituent are useful antioxidants for rubber. This use is claimed in the application of J. P. Brown and J. H. New, Serial No. 377,510 filed June 24, 1964. The amino radical may be primary, secondary or tertiary amino as illustrated above. Those 4-aminoaliphatic substituted compounds which contain substituents apart from those in the 2- and 4-positions are preferred because they can be used in light colored rubber goods. They have little tendency to discolor. The amount of dihydroquinoline or its salt incorporated in the rubber can vary within wide limits, but in general it has been found preferable to use from 0.2 to 3 parts by weight and particularly 0.5 to 2 parts by weight per hundred parts by weight of rubber. Amounts somewhat outside these limits can sometimes be employed, for instance from 0.1 to 5 parts of the additive per hundred parts of rubber. Very satisfactory results have been obtained using about 1.5 parts by weight of the anti-oxidant per hundred parts by weight of rubber. The 4-aminoaliphatic-2,2-dialiphatic-1,2-dihydroquinolines and their salts are effective antioxidants for both natural and synthetic rubber. Synthetic rubbers which can be used include polymers of 1,3-butadienes, for instance 1,3-butadiene itself and isoprene, copolymers of 1,3-butadienes with other monomers, such as styrene, acrylonitrile, isobutylene or methyl methacrylate, and polyolefin rubbers, for instance ethylene-propylene copolymers.

A masterbatch of the following composition was compounded on a laboratory mill:

Parts by weight
Pale crepe rubber _____ 100
Zinc oxide _____ 5
Stearic acid _____ 1
Blanc fixe _____ 50
Titanium dioxide _____ 5
Sulfur _____ 2.5
Diphenylguanidine _____ 1.0

A portion of the masterbatch was taken, and the antioxidant was milled into it in an amount equivalent to 1.5 parts by weight per 100 parts by weight of rubber in the masterbatch.

A number of rectangular bands, each having side walls 79 mm. in length and 4 mm. x 1 mm. in cross-section, and thickened end walls 11 mm. in length, were moulded from the rubber stock by vulcanizing at 153° C. for 30 minutes.

The stress required to extend the bands in their original or "unaged" condition to 1½ times their unstretched length was determined using a Baldwin machine by taking one band, stretching it to 50% extension, releasing, and again stretching to 50% extension, the stress required for the second extension being the figure recorded.

Two other bands were placed in an air oven at 90° C., one of the two bands being supported so that except for its own weight it was unstressed, while the other was extended over hooks so spaced that the length of the band was 44± 0.5% more than its unstretched length.

After 48 hours, the bands were removed from the oven, and after cooling, the stress required to extend each to 1½ times its original length was measured using the same procedure as for the original unaged band.

Corresponding measurements were made on a control set of bands moulded from a further portion of the masterbatch containing no antioxidant.

The results are given in the table below.

Where a band contained an antioxidant and was unstressed during aging, the stress required to extend it to 1½ times its unstretched length was only slightly less after the 48 hours of the test than at the beginning, whereas for the corresponding control band, the stress fell to ¾ of its original value over the same period. Where a band was stressed during aging, the stress required to extend it to 1½ times its unstretched length after the 48 hours was considerably higher for a band containing an antioxidant than for the control.

| Antioxidant | Percent Original Stress Retained after 48 hours at 90° C. | |
|---|---|---|
| | Unstressed during aging | Stressed during aging |
| 2,2-Dimethyl-4-diethylaminomethyl-1,2-dihydroquinoline | 93 | 29 |
| 2,2-Dimethyl-4-morpholinomethyl-1,2-dihydroquinoline | 91 | 40 |
| 2,2-Dimethyl-4-(p-ethoxyanilino)methyl-tribromo-1,2-dihydroquinoline | 91 | 35 |
| 2,2-Dimethyl-4-(p-dimethylaminoanilino)methyl-tribromo-1,2-dihydroquinoline | 97 | 58 |
| None | 75 | 9 |

It is intended to cover all changes and modifications of the examples of the invention herein chosen for purposes of disclosure which do not constitute departures from the spirit and scope of the invention.

What is claimed is:

1. A compound selected from the group consisting of a compound having the formula

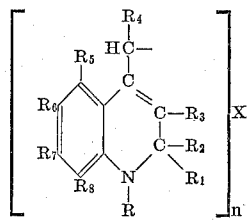

where $n$ is an integer at least one but less than three, X is selected from a group consisting of hydroxy, lower alkoxy, cyano, thiocyano, mercapto, lower alkylthio, aryloxy, arylthio, thiazolylthio, lower alkylenedioxy, lower alkylenedithio, dithiocarbamyl, lower alkylene bis dithiocarbamyl, isothiouronium, amino, lower alkylamino, cyclohexylamino, benzylamino, arylamino, pyridylamino, di (lower alkyl)amino, piperidino, morpholino, lower alkyl imino, lower alkylene diamino, arylene diamino, piperazinyl, acetyl lower alkoxycarbonylmethyl and bis(lower alkoxycarbonylmethyl), R is selected from a group consisting of hydrogen, carboxylic acid acyl of not more than 12 carbon atoms, lower alkyl sulfonyl and aryl sulfonyl, $R_1$ and $R_2$ are lower alkyl, $R_3$ is selected from a group consisting of hydrogen and halogen, $R_4$ is selected from a group consisting of hydrogen and lower alkyl, $R_5$, $R_6$, $R_7$ and $R_8$ are selected from a group consisting of hydrogen, halogen, lower alkoxy, hydroxy, amino, nitro, lower alkyl and aryl, acid addition salts and quaternary ammonium salts thereof, wherein aryl of the aforesaid radicals refers to phenyl and phenyl substituted by halogen, alkoxy, or tertiary amino.

2. 2,2 - dimethyl-4-di(lower alkyl)aminomethyl-1,2-dihydroquinoline.

3. 2,2 - dimethyl - 4 - arylaminomethyl - 1,2 - dihydroquinoline wherein aryl refers to phenyl and phenyl substituted by halogen, alkoxy, or tertiary amino.

4. 2,2 - dimethyl - 4 - di(lower alkyl)aminomethyl 6-lower alkoxy-1,2-dihydroquinoline.

5. 2,2 - dimethyl - 4 - aminomethyl - 1,2 - dihydroquinoline.

6. Bis(2,2 - dimethyl - 1,2 - dihydroquinol - 4 - yl-methyl)dimethylammonium bromide.

7. 2,2 - dimethyl - 4 - (2' - benzothiazylthiomethyl)-tribromo-1,2-dihydroquinoline.

8. 2,2 - dimethyl - 4 - lower alkoxymethyltribromo-1,2-dihydroquinoline.

9. 2,2 - dimethyl - 4 - thiocyanomethyltribromo - 1,2-dihydroquinoline.

10. 2,2 - dimethyl - 4 - N,N - di(lower alkyldithiocarbamyl)methyltribromo-1,2-dihydroquinoline.

11. S - (2,2 - dimethyltribromo - 1,2 - dihydroquinol-4-yl)methyl isothiouronium bromide.

12. 2,2 - dimethyl - 4 - mercaptomethyltribromo - 1,2-dihydroquinoline.

13. 2,2 - dimethyl - 4 - aminomethyl - tribromo - 1,2-dihydroquinoline.

14. 2,2 - dimethyl - 4 - morpholinomethyl - 1,2 - dihydroquinoline.

15. 2,2 - dimethyl - 4 - (p - ethoxyanilino)methyltribromo-1,2-dihydroquinoline.

16. 2,2 - dimethyl - 4 - (p - dimethylaminoanilino)methyl-tribromo-1,2-dihydroquinoline.

17. 2,2 - dimethyl - 4 - di(lower alkyl)aminomethyl-tribromo-1,2-dihydroquinoline.

18. 2,2 - dimethyl - 4 - (pyrid - 2' - ylaminomethyl)tribromo-1,2-dihydroquinoline.

19. Bis[(2,2 - dimethyl - tribromo - 1,2 - dihydroquinol-4-yl)methyl]methylamine.

No references cited.

ALEX MAZEL, *Primary Examiner.*

HENRY R. JILES, *Examiner.*

RICHARD J. GALLAGHER, *Assistant Examiner.*